March 24, 1925.                                              1,530,679
F. LAMBERT
BREAKABLE OR SEPARABLE JOINT FOR WATER METERS AND THE LIKE
Filed Dec. 30, 1921          2 Sheets-Sheet 1
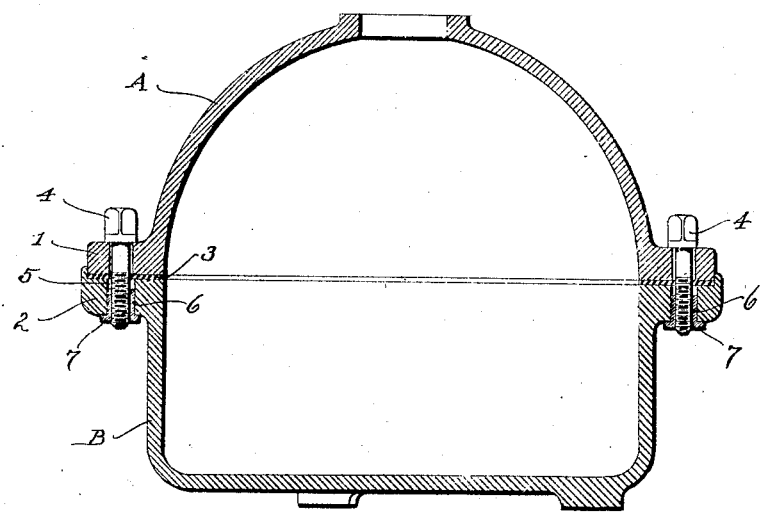
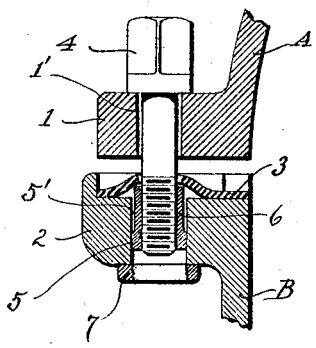 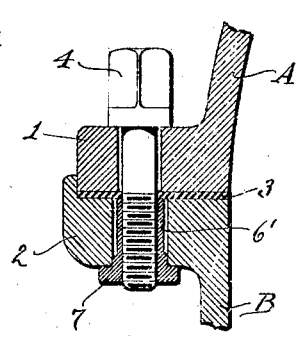 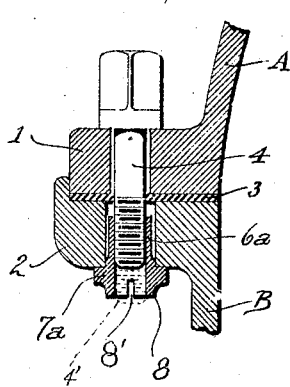
Frank Lambert
INVENTOR.
BY
A. Alexander Thomas
ATTORNEY March 24, 1925. 1,530,679
F. LAMBERT
BREAKABLE OR SEPARABLE JOINT FOR WATER METERS AND THE LIKE
Filed Dec. 30, 1921 2 Sheets-Sheet 2
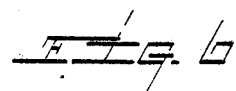
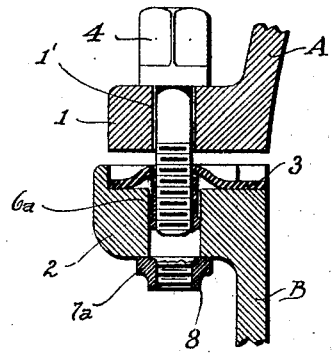
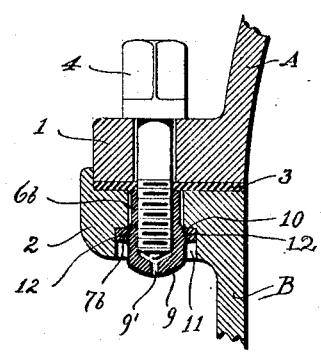
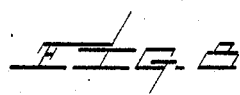
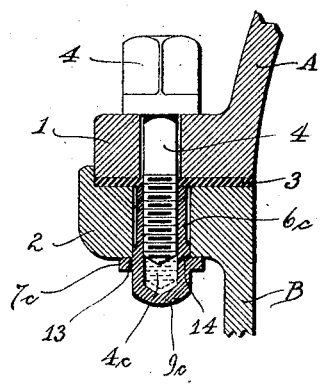
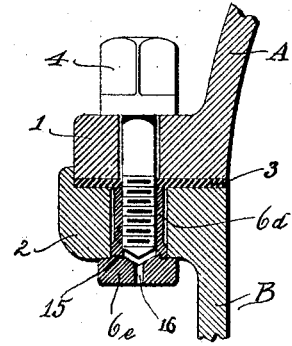
Frank Lambert
INVENTOR.
BY
A. Alexander Thomas
ATTORNEY.

Patented Mar. 24, 1925.

1,530,679

UNITED STATES PATENT OFFICE.

FRANK LAMBERT, OF BROOKLYN, NEW YORK.

BREAKABLE OR SEPARABLE JOINT FOR WATER METERS AND THE LIKE.

Application filed December 30, 1921. Serial No. 526,043.

*To all whom it may concern:*

Be it known that I, FRANK LAMBERT, a citizen of the United States, and a resident of Brooklyn, county of Kings, and State of New York, have invented certain new and useful Improvements in Breakable or Separable Joints for Water Meters and the like, of which the following is a full, clear, and exact specification.

My invention relates generally to breakable or separable joints and finds special use in water-meter casings where provisions must be made for permitting separation of the casing parts when the water in the meter freezes. The object of my invention is to provide a simple and inexpensive joint, which normally holds the casing parts firmly together but automatically separates under excessive pressure.

Broadly stated, my new joint comprises one or more bolts or other fastening members provided at each end with a head, between which the members of the joint (such as the parts of a water-meter casing) are rigidly held together in normal position. One of the heads of these bolts or fastening members is so constructed as to break or separate under excessive pressure to permit separation of the joint members. In the simpler form of my invention, these separable heads may be in the form of nuts arranged to engage one end of the bolts and adapted to break off, or otherwise separate from the bolts, under excessive pressure.

For the sake of explaining my invention, I have shown the same applied to a water-meter casing, although it is obvious that the invention is not limited to such use.

In the drawings—

Fig. 1 is a transverse cross-section of a conventional construction of water-meter casing provided with a preferred form of my new joint, the parts being shown in normal position;

Fig. 2 is an enlarged fragmentary view of the joint shown in Fig. 1, the parts being shown in separated position;

Fig. 3 is a fragmentary view of a slightly modified form of joint, in which the breakable nut extends to the gasket of the joint, the parts being shown in normal position;

Fig. 4 is a fragmentary view in cross-section, showing a still different form of nut, the parts being in normal position;

Fig. 5 is a view similar to Fig. 4, showing the joint separated; and

Figs. 6, 7 and 8 are fragmentary views in cross-section of joints showing different forms of breakable or separable nuts which engage the fastening bolts.

I will first describe the form of joint illustrated in Figs. 1, 2 and 3. In Fig. 1, I have shown a conventional form of water-meter casing consisting of the sections A and B. The upper section A is provided with a flange 1 and the lower section has a similar flange 2. A gasket 3 is interposed between the flanges. The flange 1 is provided with a number of holes 1' suitably spaced and adapted to receive freely bolts 4. By making the holes 1' considerably larger than the bolts, I prevent straining and twisting of the bolts when the casing is forced apart under excessive internal pressure. When I use the term "bolt", I would have it understood that I mean any suitable member or device for normally holding the casing parts or other joint members together. The flange 2 of the lower section B is provided with openings 5 in alignment with the bolt holes of the flange 1. In the openings 5 fit nuts 6, the hubs of which are screw-threaded to engage the screw-threaded ends of the bolts 4. It is preferable to have the nuts fit loosely in the openings 5, as indicated by the clearing space 5'. The nuts 6 are at their outer ends provided with shoulders 7 adapted to engage the flange 2 of the meter casing, as shown in Fig. 1. The shoulders 7 of Figs. 1, 2 and 3 may be of polygonal shape to prevent the nuts from rotating when the bolts 4 are turned. In Figs. 1 and 2, the screw-threaded hub of the nut 6 does not extend into contact with the gasket 3. But in the form of joint shown in Fig. 3, the nut 6' is long enough to extend to the gasket 3 when the casing is bolted tight. Otherwise, there is no difference between the constructions shown in Figs. 1, 2 and 3.

The nuts 6 and 6' are made of a material which is capable of withstanding a certain pressure and will separate or break when the pressure becomes excessive. As instances of such material, I may mention cast iron, or so-called type metal, which is an alloy of tin, lead and antimony.

The operation of the joint is as follows: In assembling the parts, the bolts 4 are tightened to a predetermined limit. This may easily be done by using a wrench which automatically becomes inoperative, or otherwise informs the operator, when the bolt has been tightened a certain degree. An example of such a safety wrench, or "fixed pressure" wrench, is shown in my Patent No. 1,388,866, dated August 30, 1921. With a construction as shown in Fig. 3, where the nut 6' extends to the gasket 3 no special wrench is required. The nuts 6 and 6' are capable of safely withstanding the normal pressure exerted on the parts A and B when held between the heads 4 of the bolts and the flanges 7 of the nuts. In the broad aspect of my invention, the flanges 7 may be considered as separable or breakable heads of the bolts, the other heads of the bolts being rigid. In the event of an excessive pressure within the casing, as when the water freezes, the flanges 7 of the nuts are broken off, as indicated in Fig. 2, thus allowing separation of the casing parts A and B. This separation of the parts is necessary to prevent injury to the casing and internal mechanism of the meter. As this internal mechanism forms no part of my invention and is well understood by those skilled in the art, I have not deemed it necessary to show or describe the same.

As may be seen from Fig. 2, when the flanges 7 of the nuts are broken off, the two sections of the casing are free to separate as far as may be necessary. In other words, the broken nuts do not interfere with or restrict the parting of the top and bottom parts of the casing.

In Fig. 4, the hub of the nut 6a, extends beyond the shoulder 7a as shown at 8, thus providing an extra thickness of metal for the flange 7a. The extension 8 of the nut 6a may be slotted, as shown at 8', to receive a screw-driver or similar tool. The bolt 4 in Fig. 4 need not extend through the entire length of the nut, as shown in full lines. However, if desired, the bolt may be made long enough to extend past the flange 7a, as indicated by the dotted lines 4'. The nut 6a fits loosely in the opening and does not extend to the gasket. The operation of the joint shown in Fig. 4 is precisely the same as that of the joint shown in Figs. 1, 2 and 3, previously described. Fig. 5 shows how the joint illustrated in Fig. 4 separates under excessive pressure in the casing.

In Fig. 6 the nut 6b is formed with a shoulder 7b and a cap 9, which is slotted at 9' to permit the application of a suitable tool. The shoulder 7b of the nut 6b rests against a seat 10 of the recess 11 formed in the flange 2 of the casing section B. Under excessive pressure, the nut 6b will break at the point of least resistance, which may be along a line roughly indicated at 12. The precise point of breakage or separation is immaterial.

In the modification of Figs. 7, the nut 6c is similar to the nut 6b of Fig. 6, except that it has a longer hub, in view of the fact that the flange 2 is in this case not provided with a recess. The nut 6c has a shoulder 7c and a cap 9c, which may be polygonal or slotted. The bolt 4 in Fig. 7 is shown as terminating at the flange 7c, but it may extend beyond the same, as indicated in dotted lines 4c. Under excessive pressure, the nut 6c will break along a line roughly indicated at 13, or possibly at 14, depending upon the dimensions and material of the nut, particularly of the flange 7c.

In Fig. 8 the nut 6d is formed with a heavy cap 6e, which will break off approximately along the line 15 under excessive pressure. The cap 6e may be provided with a screw-slot 16.

In the constructions of Figs. 6, 7 and 8, where the nuts extend to the gasket, no "fixed tension" wrench is necessary.

It will be noted that in the various forms of my new joint, as above described, there is no pressure or shearing action of the nut against the gasket 3 when the bolts 4 are tightened. There is thus no danger of cutting into the gasket 3 in the assembling of the parts.

While I have herein shown and described several modifications as exemplifying my invention, it will be understood that the idea of my invention may be embodied in other ways than those herein set forth.

What I claim as my invention is:

A casing comprising two sections, each section having an annular flange provided with holes which are arranged to register when the sections are assembled, bolts passing through said holes, and nuts on said bolts, each nut consisting of a screw-threaded hub arranged to extend into the hole to engage the bolt and an integral shoulder arranged to engage one of said flanges around the bolt hole, said shoulder being constructed to break off under excessive pressure in the casing.

FRANK LAMBERT.